US010303226B2

(12) United States Patent
Chen et al.

(10) Patent No.: US 10,303,226 B2
(45) Date of Patent: May 28, 2019

(54) SECURING BRACKET FOR PERIPHERAL CARDS

(71) Applicant: Quanta Computer Inc., Taoyuan (TW)

(72) Inventors: Chao-Jung Chen, Taoyuan (TW);
Yaw-Tzorng Tsorng, Taoyuan (TW);
Chen Tseng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 46 days.

(21) Appl. No.: 14/723,091

(22) Filed: May 27, 2015

(65) Prior Publication Data

US 2016/0085275 A1 Mar. 24, 2016

(30) Foreign Application Priority Data

Sep. 23, 2014 (TW) ............... 103132827 A (51) Int. Cl.
*G06F 1/18* (2006.01)
(52) U.S. Cl.
CPC ................... *G06F 1/186* (2013.01)
(58) Field of Classification Search
CPC ................ G06F 1/186; G06F 1/185
USPC ........ 361/801, 679.4, 679.6, 679.58, 679.01, 361/679.09
See application file for complete search history.

(56) References Cited

U.S. PATENT DOCUMENTS

| | | | | |
|---|---|---|---|---|
| 5,694,291 A | * | 12/1997 | Feightner | G06F 1/184 361/679.6 |
| 7,110,251 B2 | * | 9/2006 | Wu | G06F 1/184 248/674 |
| 8,056,813 B2 | * | 11/2011 | Long | G06K 13/08 235/486 |
| 2007/0175130 A1 | * | 8/2007 | Chen | G06F 1/186 52/235 |
| 2012/0328363 A1 | * | 12/2012 | Lin | G06F 1/186 403/315 |

(Continued)

FOREIGN PATENT DOCUMENTS

| | | |
|---|---|---|
| JP | 2002-064288 | 2/2002 |
| TW | I325526 B | 6/2010 |

OTHER PUBLICATIONS

Office Action dated Jul. 24, 2015 in Taiwanese Application No. 103132827.

(Continued)

*Primary Examiner* — Rockshana D Chowdhury
(74) *Attorney, Agent, or Firm* — Nixon Peabody LLP; Zhou Lu (57) ABSTRACT

A peripheral card securing apparatus for removably securing a plurality of peripheral cards to a chassis. The apparatus can comprise a securing clamp comprising a top portion and a bottom portion. For example, the securing clamp can be slidably coupled to the chassis, and sliding the securing clamp from an open position to a locked position secures the plurality of peripheral cards to the chassis. In some implementations, the top portion can comprise a first sliding aperture, a second sliding aperture, and a securing portion. For example, the first sliding aperture can be slidably engaged with a first securing point, and the second sliding aperture can be slidably engaged with a second securing point, such that the securing portion secures the plurality of peripheral cards to the chassis in the locked position.

16 Claims, 6 Drawing Sheets

(56) References Cited

U.S. PATENT DOCUMENTS

2014/0002971 A1\* 1/2014 Chung ................ H05K 5/0286
361/679.01

OTHER PUBLICATIONS

Summary of Office Action dated Jul. 24, 2015 in Taiwanese Application No. 103132827.
English Abstract of Taiwanese Publication No. TWI325526.
First Office Action mailed in Japanese Application No. 2015-238510 dated Nov. 17, 2015.
English language summary of First Office Action mailed in Japanese Application No. 2015-238510 dated Nov. 17, 2015.
English language translation of Abstract of JP 2002-064288.

\* cited by examiner

SECURING BRACKET FOR PERIPHERAL CARDS

CROSS-REFERENCE TO RELATED APPLICATIONS

This application claims priority to and the benefit of Taiwan Patent Application No. 103132827, filed Sep. 23, 2014, the contents of which are hereby incorporated by reference in their entirety.

TECHNICAL FIELD

The disclosure generally relates to a securing bracket for removably securing a plurality of peripheral cards to a chassis.

BACKGROUND

Conventionally, peripheral or accessory cards (e.g., PCIE cards) are secured to a computer chassis (e.g., server) using screws. The peripheral cards, typically in a parallel orientation with each other, are first coupled to a motherboard. The peripheral cards are then secured to the chassis one by one using screws. As is oftentimes the case, especially with regards to servers, many peripheral cards can be mounted and secured to a computer chassis to provide different functions, such as network communications, graphics processing, or other functions. However, securing many peripheral cards one by one in a server using screws can be burdensome and time consuming for the user.

SUMMARY

In some implementations, a peripheral card securing apparatus can be used to removably secure a plurality of peripheral cards to a chassis without using screws. The apparatus can comprise a securing clamp comprising a top portion and a bottom portion. For example, the securing clamp can be slidably coupled to the chassis, and sliding the securing clamp from an open position to a locked position secures the plurality of peripheral cards to the chassis. In some implementations, the top portion can comprise a first sliding aperture, a second sliding aperture, and a securing portion. For example, the first sliding aperture can be slidably engaged with a first securing point, and the second sliding aperture can be slidably engaged with a second securing point, such that the securing portion secures the plurality of peripheral cards to the chassis in the locked position. In some implementations, the second sliding aperture can be adapted to allow the securing clamp to rotate with respect to the first sliding aperture.

Particular implementations provide at least the following advantages: a plurality of peripheral cards can be removably secured to a chassis at the same time using a single securing apparatus; screws are not used, saving time and hassle.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1A:
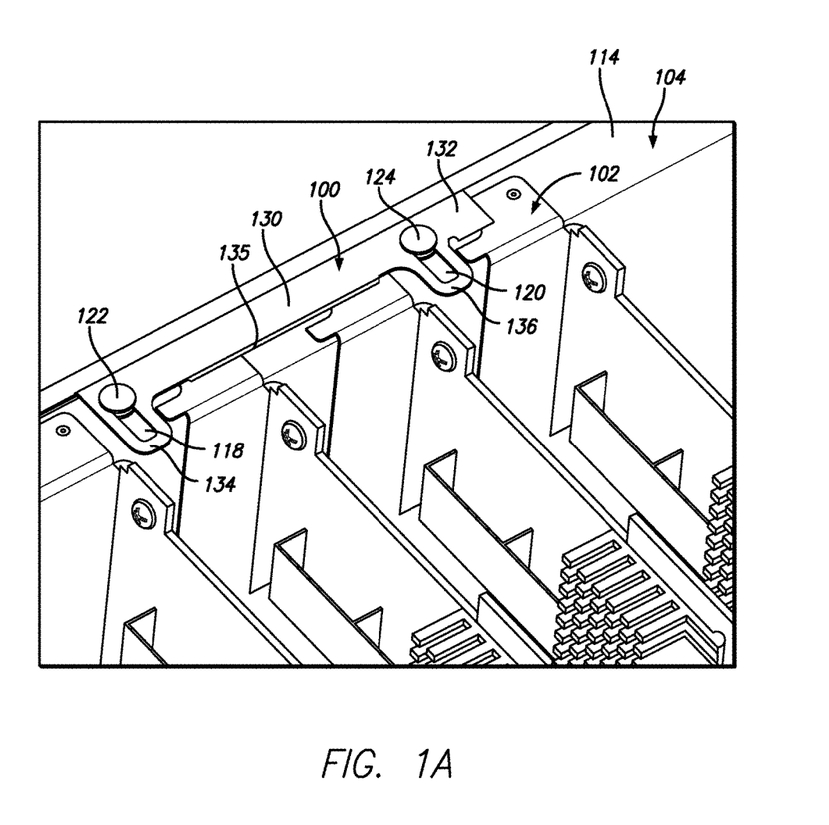
FIG. 1A is an isometric view of a peripheral card securing apparatus in a locked position.
Figure 1B:
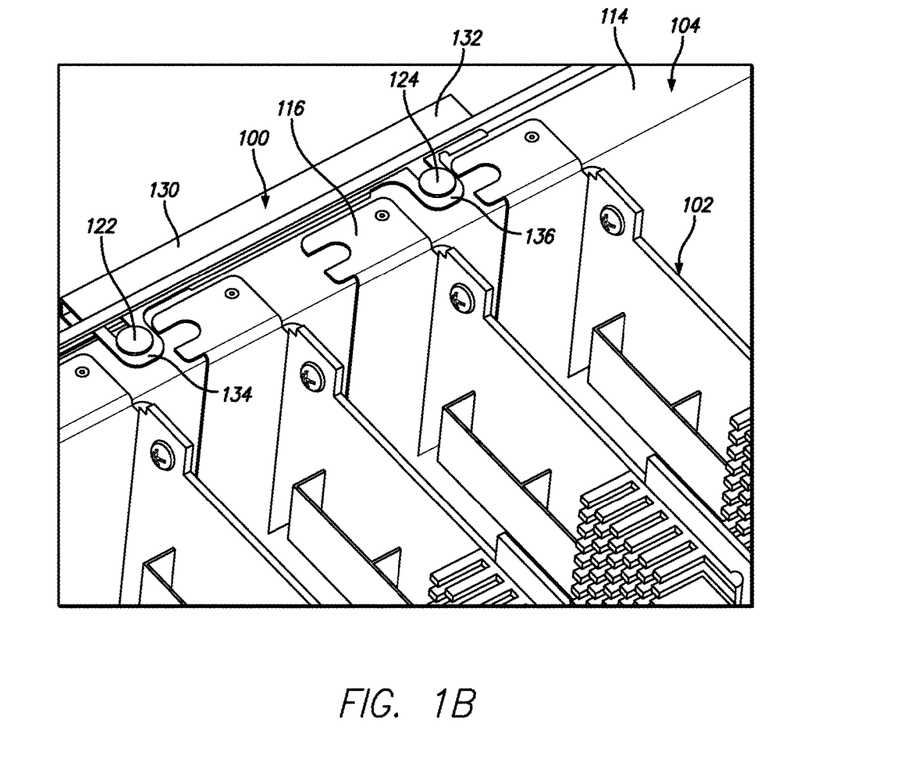
FIG. 1B is an alternate view of the apparatus of FIG. 1 showing the securing apparatus in an open position.
Figure 1C:
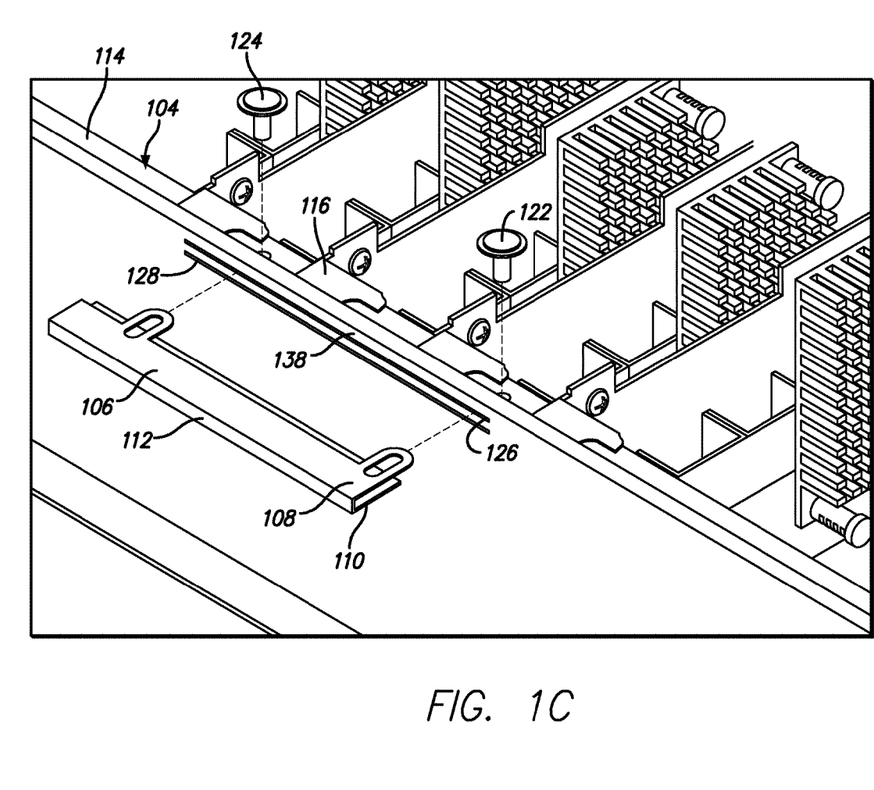
FIG. 1C is an exploded alternate view of the apparatus of FIG. 1 showing assembly of the securing apparatus to a chassis.

FIGS. 1A-1C illustrate an example peripheral card securing apparatus 100 for removably securing peripheral cards 102 to chassis 104 without using screws. Apparatus 100 can be adapted to slide from an open position (FIG. 1B) to a locked position (FIG. 1A), such that in the locked position peripheral cards 102 are secured to chassis 104. Sliding apparatus 100 back to the open position allows for removal of peripheral cards 102. For example, the open position can be when apparatus 100 is not covering peripheral cards 102 (e.g., FIG. 1B), and the closed position can be when apparatus 100 is covering peripheral cards 102 (e.g., FIG. 1A). Peripheral cards 102 can include add-on cards, or accessory cards, such as network cards, PCIE cards, sound cards, video graphics cards, etc. Chassis 104 can be any type of computing chassis known in the art, including, but not limited to, server towers, server blade, server rack, etc.

In some implementations, apparatus 100 can comprise securing clamp 106 comprising top portion 108 and bottom portion 110. Top portion 108 and bottom portion 110 can be substantially planar, flat, and rectangular in shape. In some implementations top portion 108 can be connected to bottom portion 110 through middle portion 112. For example, securing clamp 106 can be machined from a single sheet of metal, alloy, plastic, or the like, such that top portion 108, middle portion 112, and bottom portion 110 are formed by bending or molding the single sheet into at least three sections. Bottom portion 110 can be substantially wider than top portion 108, and middle portion 112 can be substantially as wide as lip 114 of chassis 104. For example, lip 114 can comprise a portion of chassis 104 where flange 116 of peripheral cards 102 can be secured to chassis 104. Flange 116 is a well-known feature in the art for securing a computing component, such as peripheral card 102, to chassis 104. For example, flange 116 can typically be a substantially planar and flat protrusion oriented orthogonally from the circuitry of the computing component, such that securing means can be used to secure the computing component (e.g., network card) to chassis 104 through flange 116. In some implementations, lip 114 can protrude outward from chassis 104.

Top portion 108 can comprise first sliding aperture 118 and second sliding aperture 120 for slidably moving securing clamp 106 with respect to chassis 104. For example, first sliding aperture 118 and second sliding aperture 120 can comprise elongated holes machined into top portion 108. First sliding aperture 118 and second sliding aperture 120 can be substantially similar in shape and size. In some implementations, first sliding aperture 118 can be located on first protrusion 134, and second sliding aperture 120 can be located on second protrusion 136. For example, first protrusion 134 and second protrusion 136 can comprise extended portions of top portion 108 that extend towards chassis 104. First protrusion 134 and second protrusion 136 can be substantially similar in shape and size.

In some implementations, first sliding aperture 118 can be slidably engaged with first securing point 122, and second sliding aperture 120 can be slidably engaged with second securing point 124. For example, first securing point 122 and second securing point 124 can be located on lip 114 of chassis 104. First securing point 122 and second securing point 124 can be substantially similar in shape and size. In some implementations, first securing point 122 and second securing point 124 can each comprise a securing bolt, which is bolted into lip 114 to slidably secure securing clamp 106 to chassis 104. Securing bolt can also slidably engage with first sliding aperture 118 and second sliding aperture 120 to allow securing clamp 106 to slide with respect to chassis 104.

In some implementations, first sliding aperture 118 and second sliding aperture 120 can define how far securing clamp 106 can slide with respect to chassis 104. For example, the longer the length of first sliding aperture 118 and second sliding aperture 120, the farther securing clamp 106 can slide along first securing point 122 and second securing point 124. In some implementations, first sliding aperture 118 and second sliding aperture 120 can have the same width and the same length to allow for uniformity in the sliding motion of securing clamp 106. For example, first sliding aperture 118 and second sliding aperture 120 can be rectangular in shape.

In some implementations, first sliding aperture 118 and second sliding aperture 120 can be defined such that middle portion 112 completely abuts lip 114 when securing clamp 106 is in the locked position. For example, middle portion 112 can be flush against lip 114. In some implementations, first sliding aperture 118 and second sliding aperture 120 can be defined such that securing clamp 106 remains slidably engaged with chassis 104. For example, first sliding aperture 118 and second sliding aperture 120 prevent securing clamp 106 from being slidably removed from chassis 104.

In some implementations, top portion 108 can slidably engage with a first elongated aperture 126 defined on lip 114. For example, the first enlongated aperture 126 can be a slim and elongate hole defined on lip 114. The first elongated aperture 126 can be adapted to receive top portion 108 to allow top portion 108 to slide through. For example, the first elongated aperture 126 can be about the same thickness as top portion 108 to allow top portion 108 to move through the first elongated aperture 126. In some implementations, bottom portion 110 can slidably engage with a second elongated aperture 128 defined below the first elongated aperture 126 on chassis 104. For example, the second elongated aperture 128 can be a slim and elongate hole defined below the first elongated aperture 126 on chassis 104. The second elongated aperture 128 can be adapted to receive bottom portion 110 to allow bottom portion 110 to slide through. For example, the second elongated aperture 128 can be about the same thickness as bottom portion 110.

Figure 1D:
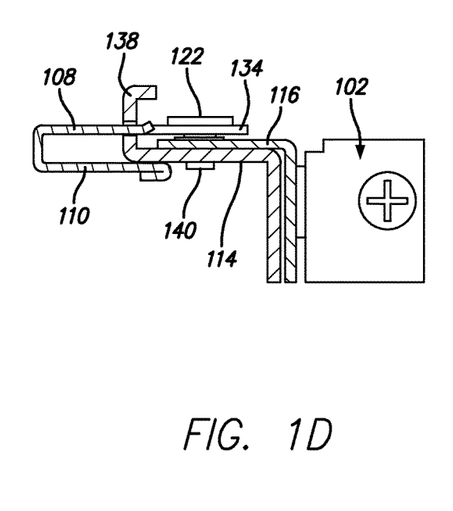
FIG. 1D is a side view of the apparatus of FIG. 1 in the open position.
Figure 1E:
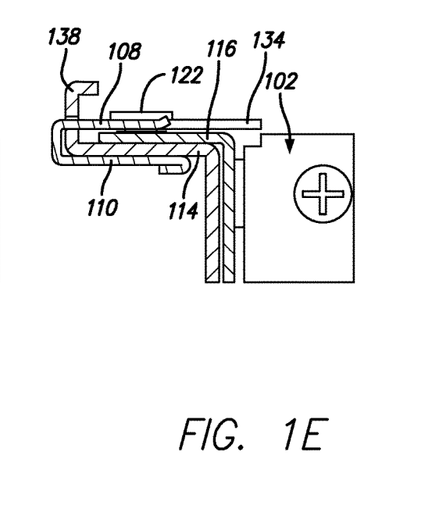
FIG. 1E is a side view of the apparatus of FIG. 1 in the closed position.

In various embodiments, apparatus 100 can comprise either the first elongated aperture 126 only, the second elongated aperture 128 only, both the first elongated aperture 126 and the second elongated aperture 128 together, or neither the first elongated aperture 126 nor the second elongated aperture 128. For example, FIGS. 1D and 1E illustrate an embodiment comprising only the first elongated aperture 126. Removing abutment 138 would obviate the need for the first elongated aperture 126, while securing clamp 106 would still be able to perform its function.

Additionally, FIG. 1C illustrates an embodiment comprising the first elongated aperture 126 and the second elongated aperture 128. Similarly, removing abutment 138 would obviate the need for the first elongated aperture 126, while the second elongated aperture 128 would still be needed. In all of these cases, securing clamp 106 would be able to perform its intended function of securing peripheral cards 102 to chassis 104.

In some implementations, top portion 108 can further comprise securing portion 130 for securing flanges 116 of peripheral cards 102. For example, securing portion 130 can be defined as the section of top portion 108 between first sliding aperture 118 and second sliding aperture 120. When securing clamp 106 slides into the closed position, securing portion 130 covers flanges 116 of peripheral cards 102 to secure peripheral cards 102 onto chassis 104. In some implementations, securing portion 130 frictionally fits against flanges 116 to secure peripheral cards 102 to chassis 104. For example, a gap can be defined between top portion 108 and bottom portion 110 such that the gap allows for top portion 108 and bottom portion 110 to frictionally fit against lip 114 and flanges 116 in the closed position.

In some implementations, bottom portion 110 can have a larger width than top portion 108. For example, bottom portion 110 can extend farther towards chassis 104 than top portion 108 to allow for stability of securing clamp 106 in the open and the closed positions. This also helps to prevent securing clamp 106 from being slidably removed from chassis 104.

In some implementations, top portion 108 can comprise securing protrusion 132 defined on top portion 108 past second sliding aperture 120. For example, securing protrusion 132 can secure at least one flange 116. Securing protrusion 132 can comprise an extension of top portion 108. In some implementations, at least two flanges 116 are secured between first securing point 122 and second securing point 124, with at least a third flange 116 secured by securing protrusion 132.

In some implementations, securing clamp 106 can comprise handle 135 for facilitating opening of apparatus 100. For example, handle 135 can be located on top portion 108 to provide grip to a user. Pulling on handle 135 can slide securing clamp 106 into the open position. Additionally, pushing against middle portion 112 can lock securing clamp 106.

FIGS. 1D and 1E illustrate apparatus 100 from a cross-sectional side view. In some implementations, first securing point 122 and second securing point 124 can each comprise locking point 140 for coupling with bottom portion 110 to secure securing clamp 106 in the locked position. For example, locking point 140 can be located underneath lip 114, and can protrude out from lip 114. In some implementations, bottom portion 110 can be adapted to frictionally fit against locking point 140. For example, as bottom portion 110 is slid into the locked position, bottom portion 110 clamps over locking point 140 to secure securing clamp 106 in the locked position.

In some implementations, peripheral cards 102 are secured a uniform distance apart from each other on chassis 104. For example, peripheral cards 102 are first coupled to a motherboard, which determines the spacing and orientation of peripheral cards 102. Once the spacing and orientation are determined, securing clamp 106 can be used to secure peripheral cards 102 to chassis 104.

Figure 2A:
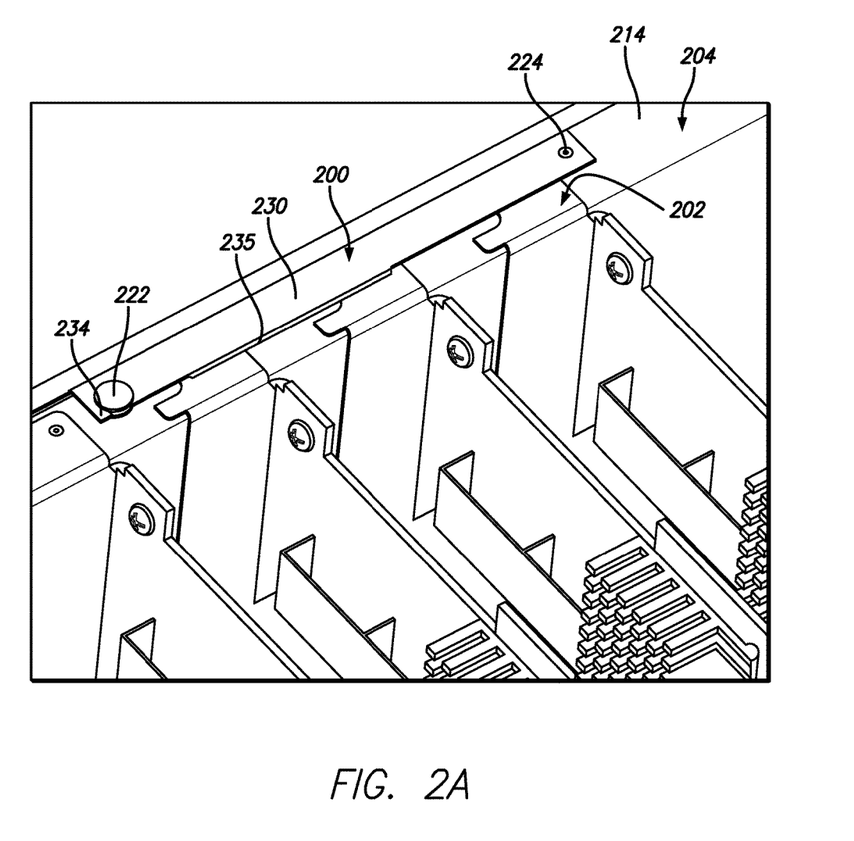
FIG. 2A is an isometric view of an alternate peripheral card securing apparatus in a locked position.
Figure 2B:
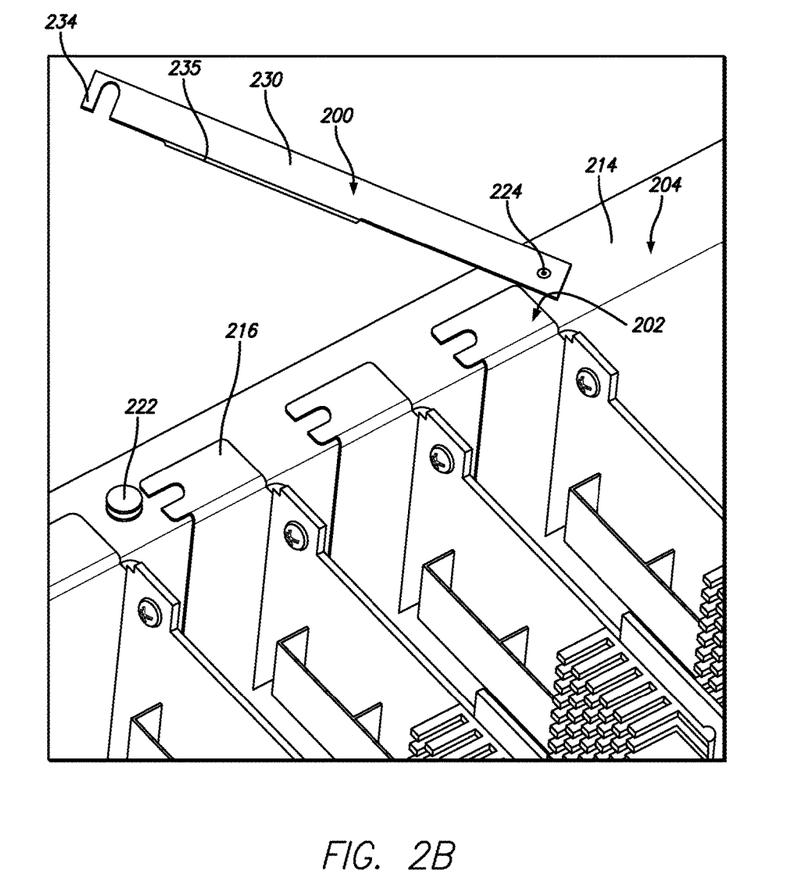
FIG. 2B is an isometric view of the apparatus of FIG. 2A in an open position.

FIGS. 2A and 2B illustrate an example peripheral card securing apparatus 200 for removably securing peripheral cards 202 to chassis 204 without using screws in a locked and open position. In the locked position, peripheral cards 202 are secured to lip 214 of chassis 204. In some implementations, apparatus 200 can be adapted to slide to an open position, such that apparatus 200 rotates outward from chassis 204 in the open position. For example, the open position can be when apparatus 200 is not covering peripheral cards 202. Peripheral cards 202 can include add-on cards such as network cards, PCIE cards, sound cards, video graphics cards, etc. Chassis 204 can be any type of computing tower known in the art, including, but not limited to, server towers.

In some implementations, as shown in FIG. 2B, pivot point 224 can be adapted to allow securing clamp 206 to rotate with respect chassis 204. For example, pivot point 224 can be fixed on chassis 204 to allow sliding aperture 234 to engage and disengage to/from securing point 222 according to means commonly known in the art. Securing point 222 can be structurally identical to first securing point 122 as described above. This allows for additional maneuverability of securing clamp 206 to allow for flexibility in insertion and removal of peripheral cards 202 to/from chassis 204.

In some implementations, apparatus 200 can further comprise securing portion 230 for securing flanges 216 of peripheral cards 202. For example, securing portion 230 can be defined between pivot point 224 and sliding aperture 234. When apparatus 200 slides into the closed position, securing portion 230 covers flanges 216 of peripheral cards 202 to secure peripheral cards 202 onto chassis 204. In some implementations, securing portion 230 frictionally fits against flanges 216 to secure peripheral cards 202 to chassis 204.

In some implementations, apparatus 200 can comprise handle 235 for facilitating opening of apparatus 200. For example, handle 235 can provide grip to a user. Pulling on handle 235 can slide apparatus 200 into the open position.

Apparatus 200 can function substantively the same as described in the above disclosure, and can include substantially the same parts to achieve the same result of securing a plurality of peripheral cards to a chassis. For example, apparatus 200 can comprise a securing clamp comprising a top portion and a bottom portion pursuant to the above disclosure to secure a plurality of peripheral card flanges to a lip of a chassis.

For clarity and simplicity, only one securing clamp is described. However, multiple securing clamps securing multiple peripheral cards can be supported by the above disclosure. For example, multiple securing clamps can be coupled to a chassis to secure multiple peripheral cards side-by-side according to the disclosure herein.

In addition, numerous specific details are set forth in order to provide a thorough understanding of the embodiments described herein. However, it will be understood by those of ordinary skill in the art that the embodiments described herein can be practiced without these specific details. In other instances, methods, procedures and members have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening members, and is not necessarily limited to physical connections. The connection can be such that the objects are permanently connected or releasably connected. The term "substantially" is defined to be essentially conforming to the particular dimension, shape or other word that substantially modifies, such that the member need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Although a variety of examples and other information were used to explain aspects within the scope of the appended claims, no limitation of the claims should be implied based on particular features or arrangements in such examples, as one of ordinary skill would be able to use these examples to derive a wide variety of implementations. For example, the securing clamp can be adapted to simultaneously slide and rotate according to the disclosure above. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An apparatus comprising:
  a chassis comprising a lip, a first securing point, and a second securing point, the first securing point and the second securing point coupled to the lip;
  at least one peripheral card disposed in the chassis, the at least one peripheral card comprising a flange; and
  a securing clamp comprising a top portion, a middle portion and a bottom portion, the securing clamp being substantially in a U-shape, wherein the middle portion connects the top portion and the bottom portion, the top portion comprising a first sliding aperture, a second sliding aperture, and a securing portion,
  wherein the first sliding aperture is located on a first protrusion of the top portion of the securing clamp, the second sliding aperture is on a second protrusion of the top portion of the securing clamp, and the securing portion is defined between the first sliding aperture and the second sliding aperture;
  wherein the first sliding aperture slidably engaged with the first securing point, and the second sliding aperture slidably engaged with the second securing point, the first sliding aperture and the second sliding aperture defining how far the securing clamp slides with respect to the chassis on the lip;
  wherein sliding the securing clamp into a locked position secures the flange of the at least one peripheral card in place on the lip between the securing portion and the bottom portion,
  wherein a first elongated aperture is defined on the lip, a second elongated aperture is defined below a first elongated aperture on the chassis; wherein the first elongated aperture is substantially parallel to the second elongated aperture;
  wherein the first elongated aperture has a height substantially the same as a thickness of the top portion of the securing clamp;

wherein the top portion of the securing clamp is slidably and completely engaged with the first elongated aperture of the chassis along a direction parallel to the flange, wherein the second elongated aperture has a height substantially the same as a thickness of the bottom portion of the securing clamp; and wherein the bottom portion of the securing clamp is slidably and completely engaged with the second elongated aperture of the chassis along the direction parallel to the flange.

2. The apparatus of claim 1, wherein the top portion is slidably engaged with a slotted aperture defined on the lip.

3. The apparatus of claim 1, wherein the securing portion is defined between the first sliding aperture and the second sliding aperture.

4. The apparatus of claim 1, wherein the bottom portion has a larger width than the securing portion.

5. The apparatus of claim 1, wherein the securing portion covers the flange in the locked position.

6. The apparatus of claim 1, wherein the first securing point comprises a first locking point and the second securing point comprises a second locking point, the first locking point and the second locking point for coupling with the bottom portion to secure the securing clamp in the locked position.

7. The apparatus of claim 1, wherein, the first sliding aperture and the second sliding aperture defined such that the middle portion completely abuts the lip when the securing clamp is in the locked position.

8. An apparatus comprising:
a chassis comprising a lip, a first securing point, and a second securing point, the first securing point and the second securing point coupled to the lip;
at least one peripheral card disposed in the chassis, the at least one peripheral card comprising a flange;
a securing clamp comprising a top portion, a middle portion and a bottom portion, the securing clamp being substantially in a U-shape, wherein the middle portion connects the top portion and the bottom portion, the top portion comprising a first sliding aperture, a second sliding aperture, and a securing portion,
wherein the first sliding aperture is located on a first protrusion of the top portion of the securing clamp, the second sliding aperture is on a second protrusion of the top portion of the securing clamp, and the securing portion is defined between the first sliding aperture and the second sliding aperture;
wherein the first sliding aperture slidably engaged with the first securing point, and the second sliding aperture slidably engaged with the second securing point, the first sliding aperture and the second sliding aperture defining how far the securing clamp slides with respect to the chassis on the lip; and
a securing protrusion, the securing protrusion defined on the top portion past the second sliding aperture such that at least two flanges are secured between the first securing point and the second securing point;
wherein a first elongated aperture is defined on the lip, a second elongated aperture is defined below a first elongated aperture on the chassis; wherein the first elongated aperture is substantially parallel to the second elongated aperture;
wherein the first elongated aperture has a height substantially the same as a thickness of the top portion of the securing clamp;
wherein the top portion of the securing clamp is slidably and completely engaged with the first elongated aperture of the chassis along a direction parallel to the flange;
wherein the second elongated aperture has a height substantially the same as a thickness of the bottom portion of the securing clamp; and
wherein the bottom portion of the securing clamp is slidably and completely engaged with the second elongated aperture of the chassis along the direction parallel to the flange; and
wherein sliding the securing clamp into a locked position secures at least two flanges in place on the lip between the securing portion and the bottom portion, and at least one flange is secured past the second securing point by the securing protrusion.

9. The apparatus of claim 8, wherein the top portion is slidably engaged with a slotted aperture defined on the lip.

10. The apparatus of claim 8, wherein the securing portion is defined between the first sliding aperture and the second sliding aperture.

11. The apparatus of claim 8, wherein the bottom portion has a larger width than the securing portion.

12. The apparatus of claim 8, wherein the securing portion covers the flanges in the locked position.

13. The apparatus of claim 8, wherein the first securing point comprises a first locking point and the second securing point comprises a second locking point, the first locking point and the second locking point for coupling with the bottom portion to secure the securing clamp in the locked position.

14. The apparatus of claim 8, wherein, the first sliding aperture and the second sliding aperture defined such that the middle portion completely abuts the lip when the securing clamp is in the locked position.

15. The apparatus of claim 1, wherein the top portion of the securing clamp has substantially the same width as a width of the first elongated aperture.

16. The apparatus of claim 8, wherein the top portion of the securing clamp has substantially the same width as a width of the first elongated aperture.

* * * * *